United States Patent
Oe et al.

(10) Patent No.: US 10,663,702 B2
(45) Date of Patent: May 26, 2020

(54) ZOOM LENS SYSTEM AND IMAGING APPARATUS

(71) Applicants: NITTOH INC., Suwa-Shi, Nagano (JP); THEIA TECHNOLOGIES LLC, Wilsonville, OR (US)

(72) Inventors: Kazuhiro Oe, Suwa (JP); Jeffrey Alan Gohman, Hillsboro, OR (US)

(73) Assignees: NITTOH INC., Suwa-Shi, Nagano (JP); THEIA TECHNOLOGIES LLC, Wilsonville, OR (US)

( * ) Notice: Subject to any disclaimer, the term of this patent is extended or adjusted under 35 U.S.C. 154(b) by 0 days.

(21) Appl. No.: 15/352,715

(22) Filed: Nov. 16, 2016

(65) Prior Publication Data

US 2017/0199361 A1   Jul. 13, 2017

Related U.S. Application Data (62) Division of application No. 14/051,154, filed on Oct. 10, 2013, now Pat. No. 9,529,181.

(51) Int. Cl.
*G02B 15/14* (2006.01)
*G02B 15/177* (2006.01)
*G02B 13/00* (2006.01)

(52) U.S. Cl.
CPC ....... *G02B 15/142* (2019.08); *G02B 13/0095* (2013.01); *G02B 15/177* (2013.01)

(58) Field of Classification Search
CPC ...... G02B 15/14; G02B 15/16; G02B 15/161; G02B 15/177; G02B 15/22; G02B 13/001; G02B 13/0045; G02B 13/009; G02B 13/0095; G02B 13/02; G02B 13/04; G02B 13/18; G02B 13/22; G02B 3/04; G02B 7/105
USPC ....... 359/354, 357, 363, 380, 422, 432, 434, 359/557, 676–677, 680, 683–684, 686, 359/689, 691, 708, 713, 737, 740, 749, 359/754, 761, 781, 784, 793, 797; 348/240.3, 345
See application file for complete search history.

(56) References Cited

U.S. PATENT DOCUMENTS 3,825,315 A   7/1974   Altman
4,494,828 A   1/1985   Masumoto
(Continued)

FOREIGN PATENT DOCUMENTS

JP   02-267511   11/1990
JP   2011007824   1/2001
(Continued)

*Primary Examiner* — Thomas K Pham
*Assistant Examiner* — Ibrahima Diedhiou
(74) *Attorney, Agent, or Firm* — Thompson Hine L.L.P.

(57) ABSTRACT

A zoom lens system includes: a primary image forming lens group that forms light from an object side into an intermediate image and a relay lens group that forms light from the intermediate image into a final image. The primary image forming lens group includes, in order from the object side, a first fixed lens group G1 with negative refractive power, a stop St, and a second fixed lens group G2 with positive refractive power, and the relay lens group includes, in order from the object side, a third fixed lens group G3 with negative refractive power, a first moving lens group G4 with positive refractive power, and a second moving lens group G5 with positive refractive power.

14 Claims, 8 Drawing Sheets

(56) References Cited

U.S. PATENT DOCUMENTS

| | | |
|---|---|---|
| 8,446,678 B2 | 5/2013 | Mihara |
| 2002/0021490 A1 | 2/2002 | Kasahara |
| 2004/0021953 A1 | 2/2004 | Betensky et al. |
| 2004/0032653 A1 | 2/2004 | Gohman |
| 2006/0110283 A1 | 5/2006 | Fish |
| 2006/0227415 A1 | 10/2006 | Caldwell |
| 2008/0198451 A1 | 8/2008 | Gohman et al. |
| 2009/0109548 A1* | 4/2009 | Kimura ................ G02B 15/161 359/690 |
| 2010/0259817 A1* | 10/2010 | Jannard .................. G02B 15/00 359/432 |
| 2014/0036142 A1* | 2/2014 | Inoko ........................ G02B 3/00 348/369 |

FOREIGN PATENT DOCUMENTS

| | | |
|---|---|---|
| JP | 2003-232993 | 8/2003 |
| JP | 2008536175 | 9/2008 |
| JP | 2010-032622 A | 2/2010 |
| JP | 2011059415 | 3/2011 |
| JP | 2011130014 | 6/2011 |

\* cited by examiner

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER (vd) | PARTIAL DISPERSION RATIO (Pgf) | LENS NAME | |
|---|---|---|---|---|---|---|---|---|
| OBJECT SIDE | | | | | | | | |
| 1 | 11.66 | 1.00 | 16.50 | 1.882997 | 40.7645 | 0.5667 | L11 | |
| 2 | 6.82 | 1.46 | 12.30 | | | | | |
| 3 | 13.54 | 2.04 | 11.70 | 1.618000 | 63.3326 | 0.5441 | L12 | |
| 4 | 2.64 | 5.44 | 6.90 | | | | | |
| STOP | Flat | 1.00 | 2.19 | | | | | |
| 5 | 15.88 | 2.55 | 4.20 | 1.834807 | 42.7246 | 0.5648 | L21 | |
| 6 | -3.99 | 0.60 | 5.10 | 1.808095 | 22.7604 | 0.6307 | L22 | LB1 |
| 7 | 8.38 | 3.94 | 6.40 | 1.438750 | 94.9446 | 0.5340 | L23 | |
| 8 | -7.71 | 0.20 | 8.70 | | | | | |
| 9 | 7.68 | 5.15 | 12.30 | 1.496999 | 81.5447 | 0.5375 | L24 | |
| 10 | -12.87 | 1.30 | 12.80 | | | | | |
| 11 | 8.52 | 2.93 | 12.00 | 1.959060 | 17.4709 | 0.6598 | L25 | |
| 12 | 14.34 | 3.34 | 10.60 | | | | | |
| INTERMEDIATE IMAGE | | 2.10 | | | | | | |
| 13 | -7.23 | 0.60 | 7.40 | 1.729157 | 54.6792 | 0.5444 | L31 | |
| 14 | 22.11 | 1.47 | 7.80 | | | | | |
| 15 | -10.06 | 2.51 | 8.00 | 1.959060 | 17.4709 | 0.6598 | L32 | |
| 16 | -6.61 | V1 | 9.20 | | | | | |
| 17 | 23.46 | 2.57 | 7.60 | 1.438750 | 94.9446 | 0.5340 | L41 | |
| 18 | -12.74 | V2 | 7.60 | | | | | |
| 19 | 10.01 | 2.10 | 7.00 | 1.882997 | 40.7645 | 0.5654 | L51 | |
| 20 | 50.66 | 1.52 | 6.30 | | | | | |
| 21 | -14.28 | 0.60 | 5.40 | 1.808095 | 22.7604 | 0.6307 | L52 | |
| 22 | 13.75 | 3.30 | 5.20 | | | | | |
| 23 | 8.59 | 2.49 | 5.50 | 1.496999 | 81.5447 | 0.5375 | L53 | |
| 24 | -8.11 | V3 | 5.40 | | | | | |
| 25 | Flat | 0.50 | 7.20 | 1.516330 | 64.1411 | 0.5353 | COVER GLASS | |
| 26 | Flat | 0.00 | | | | | | |
| FINAL IMAGE SIDE | | | | | | | | |

FIG. 3A

|  | WIDE ANGLE END | TELEPHOTO END |
|---|---|---|
| FOCAL LENGTH [mm] | 1.84 | 3.68 |
| F NUMBER | 2.0 | 4.0 |
| TOTAL ANGLE OF VIEW [°] | 126.0 | 88.0 |
| IMAGE HEIGHT OF INTERMEDIATE IMAGE [mm] | 3.93 | 2.00 |
| IMAGE HEIGHT OF FINAL IMAGE [mm] | 3.60 | |
| L25 TO INTERMEDIATE IMAGE [mm] | 3.34 | |
| INTERMEDIATE IMAGE TO L31 [mm] | 2.10 | |
| TOTAL LENS LENGTH [mm] | 69.83 | |
| BACK FOCUS (EQUIVALENT IN AIR) [mm] | 9.86 | 17.27 |
| ENTRANCE PUPIL POSITION [mm] | 5.46 | 5.46 |
| EXIT PUPIL POSITION [mm] | −8.96 | −16.84 |

FIG. 3B

| ZOOM DISTANCE (di) | WIDE ANGLE END | TELEPHOTO END |
|---|---|---|
| 16 (V1) | 9.24 | 0.40 |
| 18 (V2) | 0.40 | 1.84 |
| 24 (V3) | 9.53 | 16.94 |

FIG. 3C

|  | K | C1 | C2 | C3 | C4 | C5 | C6 |
|---|---|---|---|---|---|---|---|
| S3 | 1.7298 | 1.8547E−03 | −5.3057E−05 | 1.3753E−06 | −2.1251E−08 | 2.5003E−10 | −2.2272E−12 |
| S4 | −0.6516 | 2.1398E−03 | 1.2171E−04 | −1.8134E−05 | −3.1372E−07 | −3.9357E−09 | −6.1221E−11 |
| S9 | −5.2681 | 5.5289E−04 | −2.2060E−05 | 5.5865E−07 | −1.0925E−08 | 2.1366E−10 | −2.4316E−12 |
| S10 | −9.2536 | −4.1458E−04 | 1.4439E−05 | −3.9474E−07 | 7.9899E−10 | 2.0987E−10 | −3.1806E−12 |
| S23 | 0.1956 | −6.3556E−04 | −8.3922E−06 | 4.3844E−07 | −7.6630E−08 | −5.6989E−09 | 4.2685E−11 |
| S24 | 0.0717 | 3.1380E−04 | −1.9537E−05 | 2.7244E−06 | −2.9607E−07 | 5.9532E−09 | −1.9633E−10 |

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER (vd) | PARTIAL DISPERSION RATIO (Pgf) | LENS NAME | |
|---|---|---|---|---|---|---|---|---|
| OBJECT SIDE | | | | | | | | |
| 1 | 11.00 | 2.00 | 14.10 | 1.882997 | 40.7645 | 0.5667 | L11 | |
| 2 | 5.29 | 1.45 | 9.20 | | | | | |
| 3 | 10.99 | 1.07 | 8.50 | 1.534502 | 55.6992 | 0.5684 | L12 | |
| 4 | 2.26 | 4.82 | 5.60 | | | | | |
| STOP | Flat | 0.60 | 2.41 | | | | | |
| 5 | 16.42 | 2.26 | 3.50 | 1.816000 | 46.6198 | 0.5568 | L21 | |
| 6 | -3.60 | 0.60 | 4.30 | 1.808095 | 22.7604 | 0.6307 | L22 | LB1 |
| 7 | 9.33 | 3.31 | 5.30 | 1.438750 | 94.9446 | 0.5340 | L23 | |
| 8 | -6.76 | 0.20 | 7.20 | | | | | |
| 9 | 8.46 | 4.08 | 9.30 | 1.496999 | 81.5447 | 0.5375 | L24 | |
| 10 | -9.77 | 2.95 | 9.50 | | | | | |
| 11 | 7.08 | 4.99 | 9.30 | 1.945945 | 17.9839 | 0.6544 | L25 | |
| 12 | 22.93 | 1.00 | 6.60 | | | | | |
| INTERMEDIATE IMAGE | | 0.49 | | | | | | |
| 13 | -8.02 | 0.60 | 5.70 | 1.618000 | 63.3326 | 0.5441 | L31 | |
| 14 | 8.67 | 1.89 | 5.70 | | | | | |
| 15 | -6.73 | 0.62 | 6.00 | 1.816000 | 46.6198 | 0.5568 | L32 | LB2 |
| 16 | -19.08 | 2.79 | 6.70 | 1.945945 | 17.9839 | 0.6544 | L33 | |
| 17 | -6.31 | V1 | 7.90 | | | | | |
| 18 | 18.84 | 2.08 | 6.70 | 1.438750 | 94.9446 | 0.5340 | L41 | |
| 19 | -13.31 | V2 | 6.40 | | | | | |
| 20 | 8.94 | 1.76 | 6.00 | 1.772499 | 49.5976 | 0.5520 | L51 | |
| 21 | 23.79 | 1.93 | 5.60 | | | | | |
| 22 | -12.70 | 0.60 | 5.10 | 1.922860 | 20.8800 | 0.6388 | L52 | |
| 23 | 44.03 | 2.17 | 5.10 | | | | | |
| 24 | 5.54 | 2.49 | 5.60 | 1.438750 | 94.9446 | 0.5340 | L53 | |
| 25 | -6.95 | V3 | 5.30 | | | | | |
| 26 | Flat | 0.50 | | 1.516330 | 64.1411 | 0.5353 | COVER GLASS | |
| 27 | Flat | 0.00 | | | | | | |
| FINAL IMAGE SIDE | | | | | | | | |

FIG. 8A

|  | WIDE ANGLE END | TELEPHOTO END |
|---|---|---|
| FOCAL LENGTH [mm] | 1.84 | 3.00 |
| F NUMBER | 1.8 | 2.9 |
| TOTAL ANGLE OF VIEW [°] | 117.0 | 90.0 |
| IMAGE HEIGHT OF INTERMEDIATE IMAGE [mm] | 2.70 | 1.75 |
| IMAGE HEIGHT OF FINAL IMAGE [mm] | 3.00 | |
| L25 TO INTERMEDIATE IMAGE [mm] | 1.00 | |
| INTERMEDIATE IMAGE TO L31 [mm] | 0.49 | |
| TOTAL LENS LENGTH [mm] | 62.33 | |
| BACK FOCUS (EQUIVALENT IN AIR) [mm] | 8.61 | 12.82 |
| ENTRANCE PUPIL POSITION [mm] | 5.38 | 5.38 |
| EXIT PUPIL POSITION [mm] | −9.39 | −14.24 |

FIG. 8B

| ZOOM DISTANCE (di) | WIDE ANGLE END | TELEPHOTO END |
|---|---|---|
| 17 (V1) | 6.53 | 0.35 |
| 19 (V2) | 0.35 | 2.32 |
| 25 (V3) | 8.27 | 12.48 |

FIG. 8C

|  | K | C1 | C2 | C3 | C4 | C5 | C6 |
|---|---|---|---|---|---|---|---|
| S3 | 3.2700 | 3.3256E−03 | −1.5021E−04 | 5.4065E−06 | −9.3388E−08 | −6.3194E−10 | −6.3515E−12 |
| S4 | −0.5500 | 2.0149E−03 | −1.4353E−04 | 4.6594E−05 | −1.0010E−05 | −1.0407E−08 | −1.9319E−10 |
| S9 | −9.7600 | 1.1868E−03 | −3.8462E−05 | 1.2357E−06 | −1.5863E−08 | −1.1157E−10 | 2.3468E−12 |
| S10 | −7.6400 | −4.1083E−04 | 4.1078E−05 | −7.8641E−07 | −1.1469E−08 | 1.0045E−09 | −1.7826E−11 |
| S24 | −0.3900 | −8.2982E−04 | 4.3007E−05 | −7.8240E−07 | 1.5980E−07 | −1.5069E−08 | 1.3470E−10 |
| S25 | −1.3500 | 7.7920E−04 | 4.5515E−05 | −2.8905E−06 | 3.7093E−08 | 1.5742E−08 | −6.1956E−10 |

ZOOM LENS SYSTEM AND IMAGING APPARATUS

BACKGROUND

The present invention relates to a zoom lens system and an imaging apparatus that uses such zoom lens system.

Japanese Laid-Open Patent Publication No. 2003-232993 (hereinafter "Document 1") describes the provision of a refractive optical system that forms an intermediate image and is capable of favorably forming the intermediate image in spite of using few lenses. Document 1 describes a refractive optical system including an image forming lens group that forms an intermediate image of a object, a field lens group disposed near the formation position of the intermediate image, and a relay lens group that forms the intermediate image into another image, where the focal distance f1 of the image forming lens group and the focal distance f of the refractive optical system satisfy the condition $1<|f1/f|<3$.

SUMMARY

Among wide-angle zoom lens systems whose full angle of view at the wide-angle end exceeds 110°, there is demand for a compact zoom lens system that obtains sharp images.

One aspect of the present invention is a zoom lens system consisting: a first optical system that forms light from an object side into an intermediate image; and a second optical system that forms light from the intermediate image into a final image, wherein the first optical system consists of a fixed lens group that does not move during zooming, the second optical system includes a variator lens group that moves during zooming, and the fixed lens group includes a first negative meniscus lens that is disposed closest to the object side and whose convex surface is oriented toward the object side.

In this zoom lens system, the first optical system is a lens group of wide-angle in which a first meniscus lens is disposed closest to the object side with the convex surface oriented toward the object side. This lens group guides the light flux that has passed the first meniscus lens across the opposite side to the optical axis and forms an inverted image as an intermediate image, with the final image being formed by the second optical system. In this zoom lens system, during zooming, the variator lens group included in the second optical system moves but the wide-angle and fixed lens group of the first optical system does not move. Since the first optical system that forms the intermediate image is fixed, it is possible to also fix the formation position (imaging position) of the intermediate image. This means there is no fluctuation in the imaging position of the intermediate image that accompanies zooming, and at any position during zooming from the wide-angle end to the telephoto end, the intermediate image should not be formed on a lens surface or inside a lens. This means that it is possible to suppress scratches and the like or foreign matter such as dust on lens surfaces from appearing in the final image.

In addition, since the position of the intermediate image does not move by fixing the first optical system, it is possible to design the lens system so that the back focus of the first optical system is shorter. It becomes easier to make the lens system more wide angle and to make the overall length of the first optical system shorter, which makes it easier to reduce the overall length of the zoom lens system. In addition, since the first optical system is fixed during zooming, it is possible to concentrate the driving mechanism for zooming in the periphery of the second optical system and the zooming mechanism is simplified. Accordingly, it is possible to provide a compact, wide-angle zoom lens system that is capable of forming a sharp final image.

It is desirable for the fixed lens group to include: a first fixed lens group that has negative refractive power and includes a first negative meniscus lens; a second fixed lens group that has positive refractive power and is disposed on the final image side of the first fixed lens group; and a stop disposed between the first fixed lens group and the second fixed lens group. By such configuration, it becomes easy to position the entrance pupil of the zoom lens system on the object side of the stop and close to the first fixed lens group. It makes the zoom lens system more wide angle even if the lens aperture of the first negative meniscus lens is not increased.

It is also desirable for the second fixed lens group to include a first cemented lens disposed closest to the object side and for the first cemented lens to include a biconvex positive lens and a biconcave negative lens disposed in order from the object side. By disposing the first cemented lens on the final image side to the entrance pupil, it is possible to effectively correct chromatic aberration. It is also desirable for the first cemented lens to include a biconvex positive lens disposed on the final image side of the negative lens.

It is desirable for the second optical system to include a third fixed lens group with negative refractive power that is disposed on the object side of the variator lens group and does not move during zooming. By fixing the first optical system, it is possible to fix the position of the intermediate image, and by also disposing the third fix lens group between the intermediate image and the variator lens group, it is possible to interpose the intermediate image between the fixed lens group and the third fixed lens group. Accordingly, the plane of the intermediate image dose not overlaps with on a lens surface or inside a lens during zooming.

It is desirable for the distance on the optical axis between the intermediate image and a lens surface that is closest to the object side out of the third fixed lens group to be shorter than the distance on the optical axis between the intermediate image and a lens surface that is closest to the final image side of the fixed lens group. In this zoom lens system, by fixing the respective lens groups on both the object side and the final image side of the intermediate image, it is possible to maintain a relationship whereby the distance between the intermediate image and the closest lens surface to the object side of the third fixed lens group is shorter than the distance between the intermediate image and the closest lens surface to the final image side of the fixed lens group. According to this relationship, since the front focus of the third fixed lens group becomes shorter than the back focus of the fixed lens group, it becomes easier to reduce the lens aperture of the third fixed lens group.

It is desirable for the third fixed lens group to include a first positive meniscus lens that is disposed closest to the final image side and whose convex surface is oriented toward the final image side, and for a refractive index n1 of the first negative meniscus lens and a refractive index n3 of the first positive meniscus lens to satisfy Conditions (1.1) to (1.3) below.

$$n1 \geq 1.65 \tag{1.1}$$

$$n3 \geq 1.90 \tag{1.2}$$

$$0.82 \leq n1/n3 < 1.00 \tag{1.3}$$

In this zoom lens system, by satisfying the Conditions (1.1) to (1.3), it is possible to cancel out the strong negative distortion produced by the first negative meniscus lens that has a high refractive index to make the lens system more wide angle with the strong positive distortion in the inverse direction produced by the first positive meniscus lens that also has a high refractive index. Accordingly, with this zoom lens system, it is easy to form a final image where distortion has been favorably corrected.

Typically, this zoom lens system can be designed with the negative distortion DistLf and the positive distortion DistLb satisfy Conditions (1.4) and (1.5) below.

$$DistLf \geq -10 \quad (1.4)$$

$$0.98 \leq |DistLf|/|DistLb| \leq 1.02 \quad (1.5)$$

It is desirable for the third fixed lens group to include a second cemented lens that is disposed closest to the final image side, for the second cemented lens to be composed of a second negative meniscus lens whose convex surface is oriented toward the final image side and a first positive meniscus lens disposed in order from the object side, and for the Abbe number v32 of the second negative meniscus lens and the Abbe number v33 of the first positive meniscus lens to satisfy the Conditions (A) and (B) below.

$$45.0 \leq v32 \leq 55.0 \quad (A)$$

$$15.0 \leq v33 \leq 25.0 \quad (B)$$

In this zoom lens system, Condition (A) is set so that the second negative meniscus lens is provided with weak dispersive power (low dispersion) and Condition (B) is set so that the first positive meniscus lens is provided with strong dispersive power (high dispersion). This means that by combining the second negative meniscus lens that has low dispersion and the first positive meniscus lens that has high dispersion, it is possible to favorably correct chromatic aberration from the visible region to the near-infrared region.

It is also desirable for the variator lens group to include: a first moving lens group with positive refractive power that moves from the final image side toward the object side when zooming from the wide-angle end toward the telephoto end; and a second moving lens group with positive refractive power that is disposed on the final image side of the first moving lens group and moves from the final image side toward the object side when zooming from the wide-angle end toward the telephoto end, for the first moving lens group to be composed of a first positive lens disposed closest to the final image side, for the second moving lens group to be composed of a second positive lens, a first negative lens, and a third positive lens disposed in order from the object side, and for the partial dispersion ratio Pgf41 of the first positive lens, the partial dispersion ratio Pgf51 of the second positive lens, the partial dispersion ratio Pgf52 of the first negative lens, and the partial dispersion ratio Pgf53 of the third positive lens to satisfy Conditions (2.1) to (2.4) below.

$$0.53 \leq Pgf41 \leq 0.55 \quad (2.1)$$

$$0.53 \leq Pgf53 \leq 0.55 \quad (2.2)$$

$$0.55 \leq Pgf51 \leq 0.58 \quad (2.3)$$

$$0.58 \leq Pgf52 \leq 0.66 \quad (2.4)$$

Conditions (2.1) and (2.2) show that the partial dispersion ratio Pgf41 of the positive lens closest to the object side out of the first moving lens group and the partial dispersion ratio Pgf53 of the third positive lens closest to the final image side of the second moving lens group are set low with a substantially equal balance. In addition, Condition (2.3) shows that the partial dispersion ratio Pgf51 of the second positive lens is set slightly higher than Conditions (2.1) and (2.2), and Condition (2.4) shows that the partial dispersion ratio Pgf52 of the first negative lens is set the highest out of the variator lens group. By satisfying the Conditions (2.1) to (2.4) given above, it is easy to suppress fluctuations in chromatic aberration that accompany zooming, which makes it easy to form a final image in which various aberrations are favorably corrected. In addition, by cementing together the first positive lens and a lens with positive refractive power that satisfies Condition (2.1), it is possible to more favorably correct chromatic aberration in the zoom lens system.

A further aspect of the present invention is an imaging apparatus including: the zoom lens system described above; and an imaging device disposed at a position where the final image of the zoom lens system is formed.

DETAILED DESCRIPTION

Figure 1A:
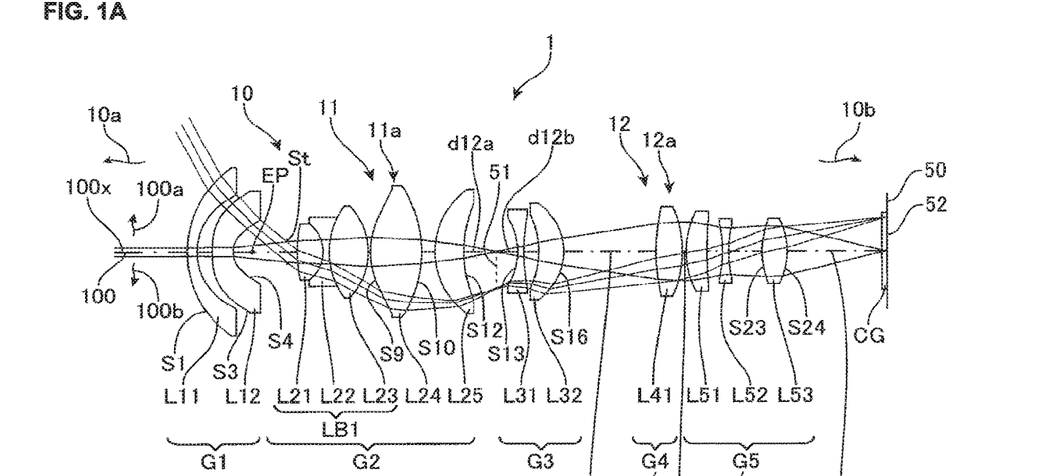
FIGS. 1A and 1B show an arrangement of a zoom lens system according to a first embodiment of the present invention and an imaging apparatus that uses such zoom lens system, with FIG. 1A including the lens arrangement at the wide-angle end and FIG. 1B including the lens arrangement at the telephoto end.
Figure 1B:
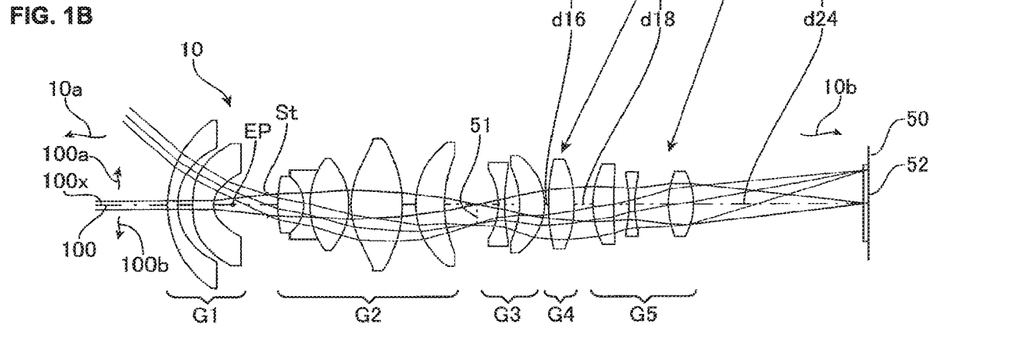

FIGS. 1A and 1B show the overall arrangement of a zoom lens system 10 according to a first embodiment of the present invention and an imaging apparatus 1 that uses such zoom lens system 10. FIG. 1A includes the lens arrangement at the wide-angle end (WIDE) and FIG. 1B includes the lens arrangement at the telephoto end (TELE). The imaging apparatus (camera) 1 includes the zoom lens system 10 and an imaging device (imaging element, image sensor) 50, such as a CCD or a CMOS, that is disposed at a position where a final image 52 of the zoom lens system 10 is formed and converts the final image 52 to an electrical signal (image data).

The zoom lens system 10 is composed, in order from a object side (subject side) 10*a*, a first optical system (primary image forming lens group) 11 that forms light from the object (subject) into an intermediate image 51 and a second optical system (secondary image forming lens group, relay lens group) 12 that forms light from the intermediate image 51 into the final image 52. The primary image forming lens group 11 is a fixed wide-angle lens group (fixed lens group) 11*a* that does not move when the zoom lens system 10 carries out zooming. The fixed wide-angle lens group 11*a* according to the present embodiment is composed, in order from the object side 10*a*, of a first fixed lens group G1 with negative refractive power, a stop (aperture stop St), and a second fixed lens group G2 with positive refractive power.

The relay lens group 12 is composed, in order from the object side 10*a*, of a third fixed lens group G3 with negative refractive power that does not move during zooming and a variator lens group 12*a* that moves during zooming. The variator (variable magnification) lens group 12*a* is composed of a first moving lens group G4 with positive refractive power that moves during zooming and a second moving lens group G5 with positive refractive power that moves during zooming. The imaging device 50 is disposed on a final image side (or "image side") 10*b* of the relay lens group 12 with a cover glass CG in between. The imaging device 50 is capable of providing image data to a host apparatus such as a personal computer and/or transfers the image data to an external information processing apparatus via a computer network or the like.

The zoom lens system 10 is an image reforming lens system (or "two-stage optical system") composed of the primary image forming lens group 11 and the relay lens group 12, and is composed of a total of thirteen lenses L11, L12, L21 to L25, L31, L32, L41, and L51 to L53 that are made of glass.

The zoom lens system 10 forms the intermediate image 51 between the primary image forming lens group 11 and the relay lens group 12 and forms the final image 52 on the final image side 10*b* of the relay lens group 12. In the primary image forming lens group of this zoom lens system 10, the first fixed lens group G1 gathers light flux that is incident from a region (an upper half region, first region, for example) 100*a* relative to a first plane 100*x* that includes the optical axis 100 into a direction along the optical axis 100 and the second fixed lens group G2 converges the light flux to converge so as to form the inverted intermediate image (inverted image) 51 on the opposite side to the first region 100*a* in another region (lower half region, second region, for example) 100*b* relative to the first plane 100*x* that includes the optical axis 100. In the relay lens group 12, the third fixed lens group G3 disperses the light flux emitted from the intermediate image 51 and the first and second moving lens groups G4 and G5 converge the light flux while varying the magnification so as to form the final image (upright image) 52, where up-down and left-right of the intermediate image 51 are inverted, in the first region 100*a*.

The first fixed lens group G1 that is closest to the object side 10*a* is a lens group which as a whole has negative refractive power and is composed of a first negative meniscus lens L11, whose convex surface S1 is oriented on the object side 10*a*, and a negative meniscus lens L12, which is also convex on the object side 10*a*, disposed in that order from the object side 10*a*. The first negative meniscus lens L11 is a lens with the largest effective diameter (aperture) in the zoom lens system 10, and is extremely compact with an effective diameter of 16.50 mm. Both surfaces of the negative meniscus lens L12, that is a convex surface S3 on the object side 10*a* and a concave surface S4 on the final image side 10*b*, are aspherical surfaces.

The second fixed lens group G2 disposed on the final image side 10*b* of the first fixed lens group G1 with the stop St in between is a lens group that as a whole has positive refractive power and is composed of a first cemented lens (balsam lens) LB1 where three lenses are stuck together, a biconvex positive lens L24, and a positive meniscus lens L25 that is convex on the object side 10*a* disposed in that order from the object side 10*a*. The first cemented lens LB1 is composed of a biconvex positive lens L21, a biconcave negative lens L22, and a biconvex positive lens L23 disposed in that order from the object side 10*a*. Both surfaces of the positive lens L24, that is, a convex surface S9 on the object side 10*a* and a convex surface S10 on the final image side 10*b* are aspherical surfaces. The distance dmia (d12*a*) on the optical axis 100 between a concave surface S12 on the final image side 10*b* of the positive meniscus lens L25 and the intermediate image 51 is 3.34 mm.

The third fixed lens group G3 disposed on the final image side 10*b* of the second fixed lens group G2 with the intermediate image 51 in between is a lens group that as a whole has negative refractive power and is composed of a biconcave negative lens L31 and a first positive meniscus lens L32 whose convex surface S16 is oriented toward the final image side 10*b* disposed in that order from the object side 10*a*. The distance dmib (d12*b*) on the optical axis 100 between the intermediate image 51 and the concave surface S13 on the object side 10*a* of the negative lens L31 is 2.10 mm.

The first moving lens group G4 disposed on the final image side 10*b* of the third fixed lens group G3 is a lens group that as a whole has positive refractive power and is composed of a biconvex positive lens (first positive lens) L41.

The second moving lens group G5 disposed closest to the final image side 10*b* is a lens group that as a whole has positive refractive power, and is composed of a positive meniscus lens (second positive lens) L51 that is convex on the object side 10*a*, a biconcave negative lens (first negative lens) L52, and a biconvex positive lens (third positive lens) L53 disposed in that order from the object side 10*a*. Both surfaces of the positive lens L53, that is, the convex surface S23 on the object side 10*a* and the convex surface S24 on the final image side 10*b*, are aspherical surfaces.

The zoom lens system 10 is a variable magnification (i.e., zoom) lens system composed of thirteen lenses L11 to L53 that are grouped into the five lens groups G1 to G5 that respectively have negative, positive, negative, positive, and positive refractive powers in that order from the object side 10*a*. With the zoom lens system 10, when zooming from the wide-angle end to the telephoto end, the fixed lens groups G1 to G3 do not move, that is the image formation magnification for the incident light flux is not changed, and by monotonously moving the moving lens groups G4 and G5 along the optical axis 100 from the final image side 10*b* toward the object side 10*a*, the image formation magnification to the intermediate image 51 is changed. The movement distance of the first moving lens group G4 (in the present embodiment, 8.84 mm) is slightly larger than the movement distance of the second moving lens group G5 (in the present embodiment, 7.41 mm). Focal adjustments (focusing) may be carried out by any of the first fixed lens group G1, the positive meniscus lens L25 of the second fixed lens group G2, and the entire zoom lens system 10.

With this zoom lens system 10, the light flux that is received from a wide range (a wide angle) via the convex surface S1 of the first negative meniscus lens L11 disposed closest to the object side 10a is guided by the primary image forming lens group 11 across the optical axis 100 to the opposite side of the optical axis 100 (the second region 100b) to form an intermediate image (primary image formation) which is the inverted image 51 and is then guided across the optical axis 100 toward the original side (the first region 100a) of the optical axis 100 by the relay lens group 12 and formed into the final image (secondary image formation) which is the upright image 52. That is, by having light that is incident from off-axis positions (i.e., off-axis rays) cross the optical axis 100 twice, the final image 52 is formed in a region (the first region 100a) on the same side of the optical axis 100 as the incident light. This means that it is not necessary to refract and form the final image by the wide-angle off-axis light rays within the first region 100a only, which makes the system more wide angle while suppressing the generation of various aberrations. Accordingly, it is also easy to improve design freedom.

With this zoom lens system 10, during zooming, the moving lens groups G4 and G5 included in the relay lens group 12 that is closer to the final image side 10b than the intermediate image 51 both move and the primary image forming lens group 11 that forms the intermediate image 51 is fixed and does not move. This means that it is possible to fix the image formation position of the intermediate image 51 so as to not move. Accordingly, there is no fluctuation in the image formation position of the intermediate image 51 that accompanies zooming, and at any zoom positions from the wide-angle end to the telephoto end, it is possible to prevent the plane of the intermediate image from becoming positioned at a lens surface or inside a lens. This means that it is possible to suppress scratches and the like or foreign matter such as dust on lens surfaces from appearing in the final image 52. In addition, in the zoom lens system 10, since the second and third fixed lens groups G2 and G3 that are closest to the intermediate image 51 are fixed on both sides of the intermediate image 51 in the direction of the optical axis 100, it is easy to maintain a seal in the periphery of the intermediate image 51 when installing the zoom lens system 10 in the imaging apparatus 1 and possible to suppress the introduction of foreign matter into the periphery of the intermediate image 51.

In addition, since it is possible to fix the imaging position of the intermediate image 51 by fixing the primary image forming lens group 11, it is possible to make the back focus of the primary image forming lens group 11 extremely short. This means that it is easier to make the lens system more wide angle and to make the overall length of the first optical system shorter, which makes it easier to reduce the overall length of the zoom lens system. In addition, since the primary image forming lens group 11 dose not move during zooming, it is possible to concentrate the driving mechanism for zooming in the periphery of the first and second moving lens groups G4 and G5, it is possible to simplify the driving mechanism and cams used for zooming. For this reason, it is easy to reduce the overall length of the zoom lens system 10 and to miniaturize the lens size of the object side 10a. Accordingly, it is possible to provide the zoom lens system 10 that can achieve a wide angle of view with a compact configuration and is capable of forming a bright and sharp final image 52. In the zoom lens system 10, the stop St is disposed between the first fixed lens group G1 and the second fixed lens group G2. The entrance pupil EP of the zoom lens system 10 is positioned on the object side 10a of the stop St, which makes it easy to place the entrance pupil close to the first fixed lens group G1. In this zoom lens system 10, since the primary image forming lens group 11 internally includes the entrance pupil EP, it is possible to construct the first fixed lens group G1 that is closer to the object side 10a than the entrance pupil EP from only lenses with negative refractive power. This means that it is possible to effectively increase the angle of view and to make the lens system more wide angle without increasing the lens apertures of the first negative meniscus lens L11 and the negative meniscus lens L12. In addition, by disposing the first cemented lens LB1 on the final image side 10b of the entrance pupil EP, it is possible to effectively correct chromatic aberration caused by the first negative meniscus lens L11 and the negative meniscus lens L12 that have different dispersion. Note that the position of the entrance pupil EP is expressed as the distance from the convex surface S1 on the object side 10a of the first negative meniscus lens L11 disposed closest to the object side 10a and in the present embodiment is 5.46 mm.

In the zoom lens system 10, the positive meniscus lens L25 that has the highest refractive index (in the present embodiment, 1.96) in the zoom lens system 10 is disposed closest to the final image side 10b side of the primary image forming lens group 11. The high refractive power of the positive meniscus lens L25 refracts the principle light rays of the incident light flux (inward) toward the optical axis 100. Accordingly, it is possible to reduce the back focus of the primary image forming lens group 11, that is, the distance d12a between the concave surface S12 of the positive meniscus lens L25 and the intermediate image 51. This makes the overall length of the zoom lens system 10 reduce. In addition, since it is possible to gather off-axis light rays toward the optical axis 100 using the positive meniscus lens L25 that has a high refractive index, it is possible to suppress an increase in the image height of the intermediate image 51. It reduces the size of the negative lens L31 that is disposed closed to the object side 10a of the relay lens group 12 and is the first lens to receive the light flux dispersed from the intermediate image 51.

In this zoom lens system 10, since a compact intermediate image 51 is formed by the primary image forming lens group 11, the negative lens L31 is placed close to the intermediate image 51. The negative lens L31 is disposed so that the distance d12b (in the present embodiment, 2.10 mm) between the intermediate image 51 and the concave surface S13 of the negative lens L31 is shorter than the distance d12a (in the present embodiment, 3.34 mm) between the concave surface S12 of the positive meniscus lens L25. Accordingly, it is possible to make the front focus of the third fixed lens group G3 shorter than the back focus of the second fixed lens group G2, the lens apertures of the third fixed lens group G3 is reduced, and the overall length of the zoom lens system 10 becomes shorter.

In this zoom lens system 10, the convex surface S1 of the first negative meniscus lens L11 of the first fixed lens group G1 that receives the incident light from the object side 10a and the convex surface S16 of the first positive meniscus lens L32 of the third fixed lens group G3 that receives the dispersed light from the intermediate image 51 are disposed as to face in opposite directions, and the zoom lens system 10 is designed so that the refractive index n1 of the first negative meniscus lens L11 and the refractive index n3 of the first positive meniscus lens L32 satisfy the following conditions (1.1) to (1.3).

$$n1 \geq 1.65 \tag{1.1}$$

$$n3 \geq 1.90 \tag{1.2}$$

$$0.82 \leq n1/n3 < 1.00 \tag{1.3}$$

In the zoom lens system 10, by satisfying the Conditions (1.1) to (1.3), by causing the first positive meniscus lens L32 that has a high refractive index to produce strong pincushion distortion (positive distortion) in the inverse direction to the strong barrel type distortion (negative distortion) produced by the first negative meniscus lens L11 that has a high refractive index to make the lens system more wide angle, it is possible to have the positive and negative distortion cancel each other out. Accordingly, it is easy to form the final image 52 where distortion has been favorably corrected.

An upper limit in Condition (1.1) should preferably be 2.25, with 2.10 more preferable, and 2.00 even more preferable. The lower limit in Condition (1.1) should preferably be 1.75, with 1.85 more preferable. An upper limit in Condition (1.2) should preferably be 2.25, with 2.10 more preferable, and 2.00 even more preferable. The lower limit in Condition (1.2) should preferably be 1.92, with 1.94 more preferable.

If the upper limit in Condition (1.1) is exceeded, there is an increase in negative distortion which makes correction difficult, while if the lower limit in Condition (1.1) is exceeded, it becomes difficult to make the lens system wide angle. If the upper limit in Condition (1.2) is exceeded, there is an increase in positive distortion which makes correction difficult, while if the lower limit in Condition (1.2) is exceeded, there is a decrease in positive distortion which makes correction difficult. If the range in Condition (1.3) is exceeded, the balance between the refractive indices is lost and it is difficult for the distortion to cancel out.

In the zoom lens system 10, by disposing the negative meniscus lens L12, both of whose surfaces are aspherical, and the positive lens L24, both of whose surfaces are also aspherical, in the primary image forming lens group 11, it is possible to suppress an increase in the negative distortion DistLf produced by the primary image forming lens group 11. Accordingly, it is easy to cancel out the negative distortion DistLf using the positive distortion DistLb produced by the relay lens group 12. This zoom lens system 10 is designed so that the negative distortion DistLf and the positive distortion DistLb satisfy Conditions (1.4) and (1.5) below.

$$\text{Dist}Lf \geq -10 \tag{1.4}$$

$$0.98 \leq |\text{Dist}Lf|/|\text{Dist}Lb| \leq 1.02 \tag{1.5}$$

The zoom lens system 10 is also designed so that the partial dispersion ratio Pgf41 of the positive lens L41, the partial dispersion ratio Pgf51 of the positive meniscus lens L51, the partial dispersion ratio Pgf52 of the negative lens L52, and the partial dispersion ratio Pgf53 of the positive lens L53 satisfy Conditions (2.1) to (2.4).

$$0.53 \leq Pgf41 \leq 0.55 \tag{2.1}$$

$$0.53 \leq Pgf53 \leq 0.55 \tag{2.2}$$

$$0.55 \leq Pgf51 \leq 0.58 \tag{2.3}$$

$$0.58 \leq Pgf52 \leq 0.66 \tag{2.4}$$

In the zoom lens system 10, the partial dispersion ratio Pgf41 of the positive lens L41 and the partial dispersion ratio Pgf53 of the positive lens L53 are set low with a substantially equal balance as shown in Conditions (2.1) and (2.2), the partial dispersion ratio Pgf51 of the positive meniscus lens L51 is set slightly higher than Conditions (2.1) and (2.2) as shown in Condition (2.3), and the partial dispersion ratio Pgf52 of the negative lens L52 is set the highest out of the variator lens group 12a as shown in Condition (2.4). By satisfying the Conditions (2.1) to (2.4) given above, it is easy to suppress fluctuations in chromatic aberration that accompany zooming, which makes it easy to form the final image 52 in which various aberrations are favorably corrected. In addition, by making both surfaces S23 and S24 of the positive lens L53, which is the final lens disposed closest to the final image side 10b in the moving lens group G4, aspherical surfaces, it is possible to favorably correct curvature of field and spherical aberration and also possible to suppress an increase in the number of lenses and suppress an increase the overall optical length.

The upper limits in Condition (2.1) and (2.2) should preferably be 0.54. The upper limit in Condition (2.3) should preferably be 0.57, and the lower limit in Condition (2.3) should preferably be 0.56. The upper limit in Condition (2.4) should preferably be 0.64, and the lower limit in Condition (2.4) should preferably be 0.60.

Figure 2:
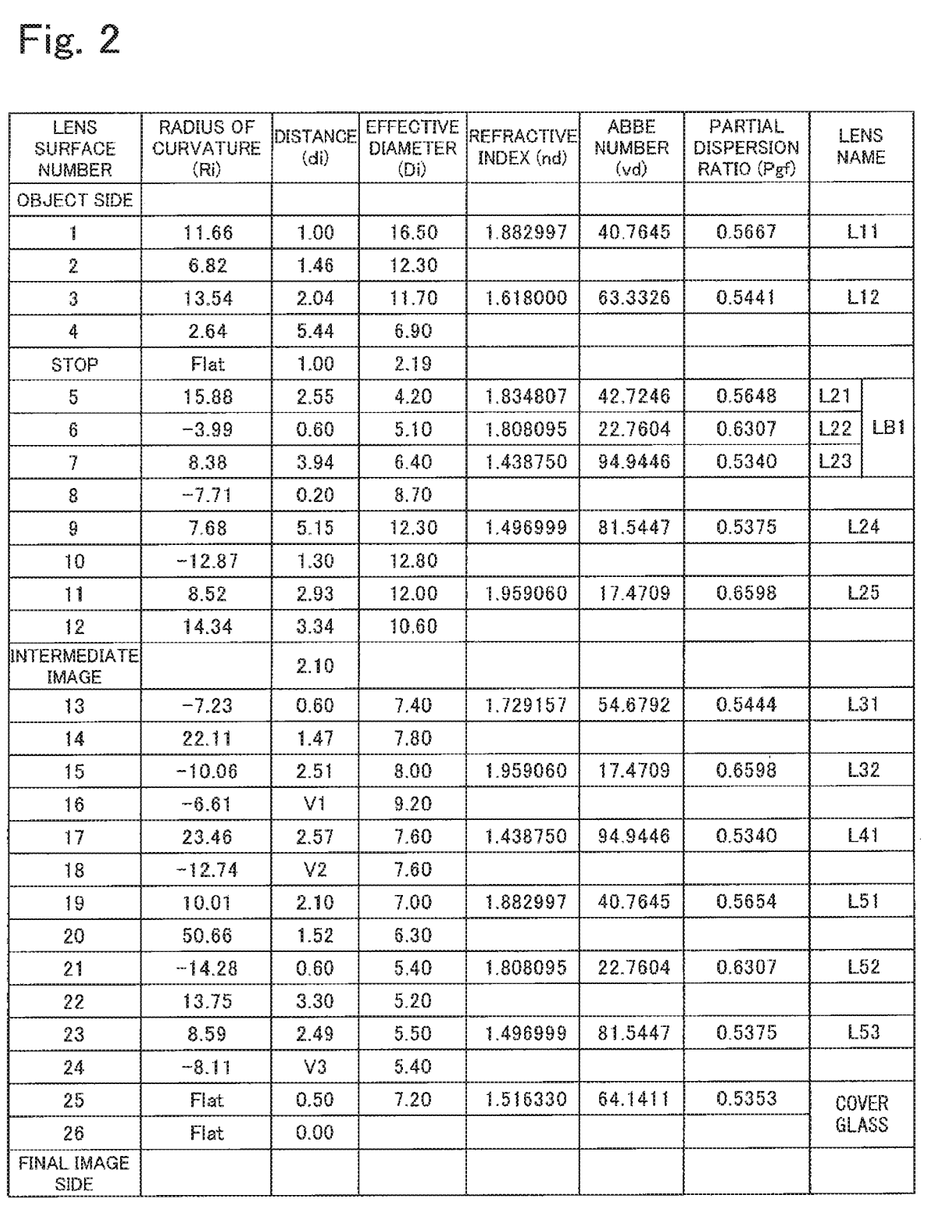
FIG. 2 shows lens data of the zoom lens system according to the first embodiment.
Figure 3A:
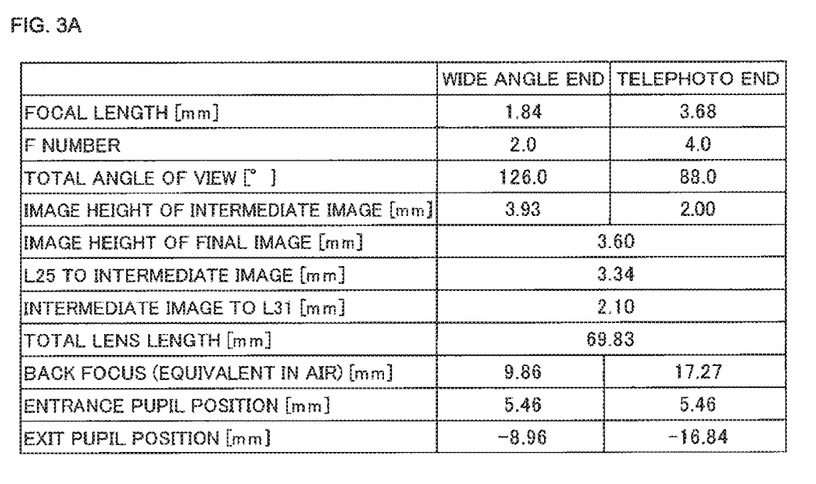
FIGS. 3A-3C are a series of tables showing various numeric values of the zoom lens system according to the first embodiment, with FIG. 3A showing fundamental data, FIG. 3B showing zoom data, and FIG. 3C showing aspherical surface data.
Figure 3B:
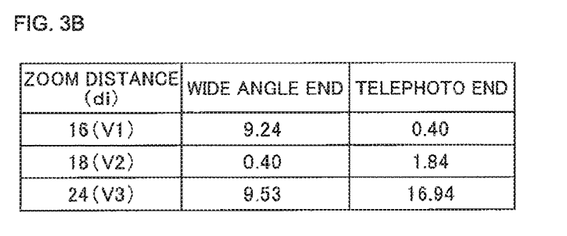
Figure 3C:
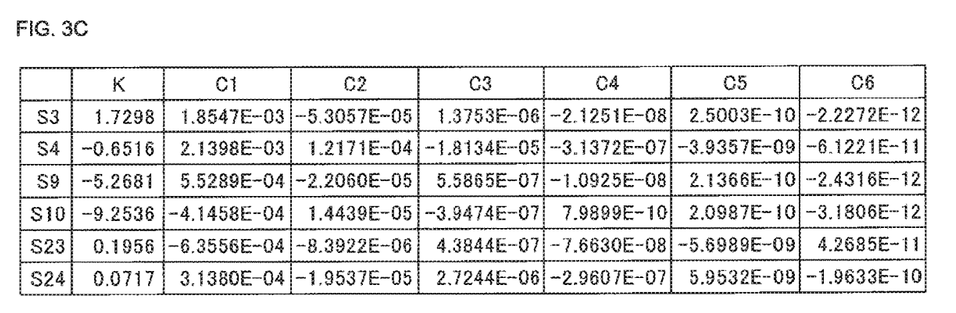

FIG. 2 shows lens data of the various lenses of the zoom lens system 10. FIGS. 3A-3C show various numeric values of the zoom lens system 10. In the lens data, "Ri" represents the radius of curvature (mm) of each lens (i.e., each lens surface) disposed in order from the object side 10a, "di" represents the distance (mm) between the respective lens surfaces disposed in order from the object side 10a, "Di" represents the effective diameter (mm) of each lens surface disposed in order from the object side 10a, "nd" represents the refractive index (d line) of each lens disposed in order from the object side 10a, and "vd" represents the Abbe number (d line) of each lens disposed in order from the object side 10a. In FIG. 2, "Flat" indicates a flat surface. Also, in FIG. 3A, the entrance pupil position shows the distance from the convex surface S1 of the first negative meniscus lens L11 and the exit pupil position shows the distance from the image plane of the imaging device 50. This is also the same in the following embodiments.

As shown in FIG. 3B, the air gap (distance) d16 between the third fixed lens group G3 and the first moving lens group G4, the air gap d18 between the first moving lens group G4 and the second moving lens group G5, and the air gap d24 between the second moving lens group G5 and the cover glass CG all change in the zoom lens system 10.

Also, both surfaces S3 and S4 of the negative meniscus lens L12, both surfaces S9 and S10 of the positive lens L24, and both surfaces S23 and S24 of the positive lens L53 are aspherical surfaces. The aspherical surfaces are expressed by the following expression using the coefficients K, C1, C2, C3, C4, C5, and C6 shown in FIG. 3C with X as the coordinate in the optical axis direction, Y as the coordinate in a direction perpendicular to the optical axis, the direction in which light propagates as positive, and R as the paraxial radius of curvature. Note that "En" represents "10 to the power n".

$$X=(1/R)Y2/[1+\{1-(1+K)(1/R)2Y2\}^{1/2}]+C1Y4+C2Y6+C3Y8+C4Y10+C5Y12+C6Y14$$

The values in the equations given as Conditions (1.1) to (1.3) and (2.1) to (2.4) described above for the zoom lens system 10 according to the present embodiment are as shown below.

| | |
|---|---|
| $n1=1.88$ | Condition (1.1) |
| $n3=1.96$ | Condition (1.2) |
| $n1/n3=0.96$ | Condition (1.3) |
| $Pgf41=0.53$ | Condition (2.1) |
| $Pgf53=0.54$ | Condition (2.2) |
| $Pgf51=0.57$ | Condition (2.3) |
| $Pgf52=0.63$ | Condition (2.4) |

Accordingly, the projection lens system 10 in the present embodiment satisfies Conditions (1.1) to (1.3) and (2.1) to (2.4).

Figure 4A:
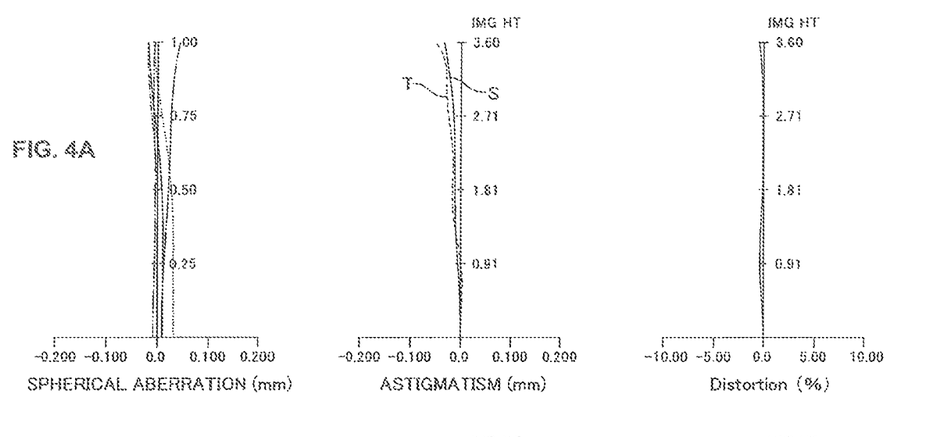
FIGS. 4A and 4B show aberration graphs of the zoom lens system according to the first embodiment, with FIG. 4A showing aberration graphs at the wide angle end and FIG. 4B showing aberration graphs at the telephoto end.
Figure 4B:
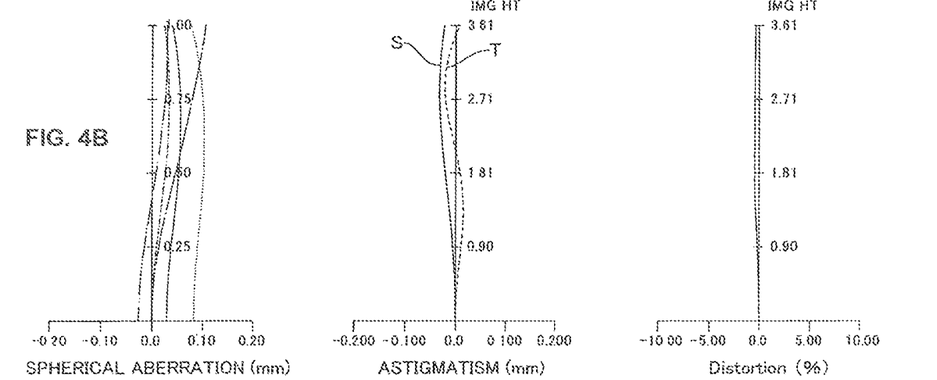
Figure 5:
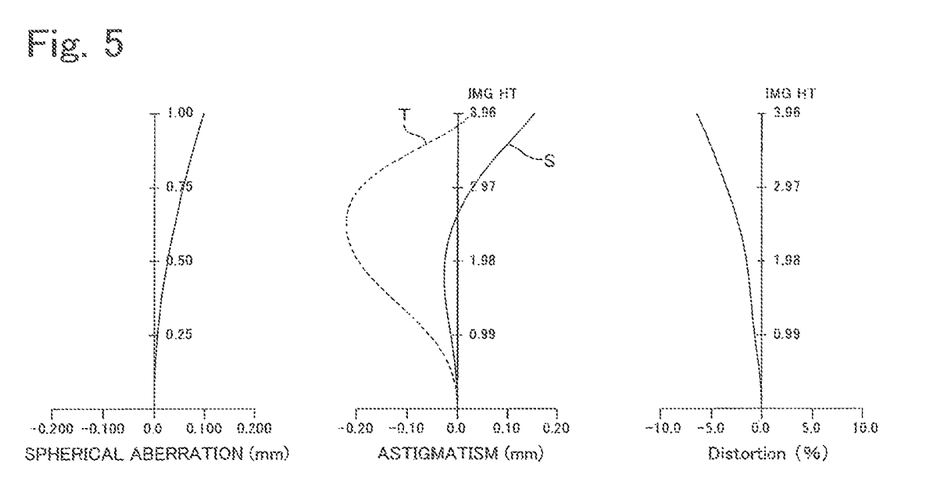
FIG. 5 shows aberration graphs of a first optical system of the zoom lens system according to the first embodiment.

FIGS. 4A and 4B show aberration graphs of the zoom lens system 10 with FIG. 4A showing aberration graphs at the wide angle end and FIG. 4B showing aberration graphs at the telephoto end. FIG. 5 shows aberration graphs of the primary image forming lens group 11 of the zoom lens system 10. As shown in FIGS. 4A-4B and FIG. 5, all of the aberrations are favorably corrected and it is possible to get sharp images. Note that spherical aberration is shown for the respective wavelengths of 656 nm (dotted line), 587 nm (solid line), 546 nm (dot-dash line), 486 nm (dot-dot-dash line), and 435 nm (dot-long dash line). In addition, astigmatism is shown separately for tangential rays (T) and sagittal rays (S). The vertical axis in the aberration graphs shows image height (IMG HT). This is also the case for the embodiments described later. Accordingly, the zoom lens system 10 according to the present embodiment is one example of a zoom lens system 10 that is wide angle with a full angle of view of 126° at the wide angle end, has an f number of 2.0 and is capable of forming sharp images, and is favorably balanced between performance and cost.

Figure 6A:
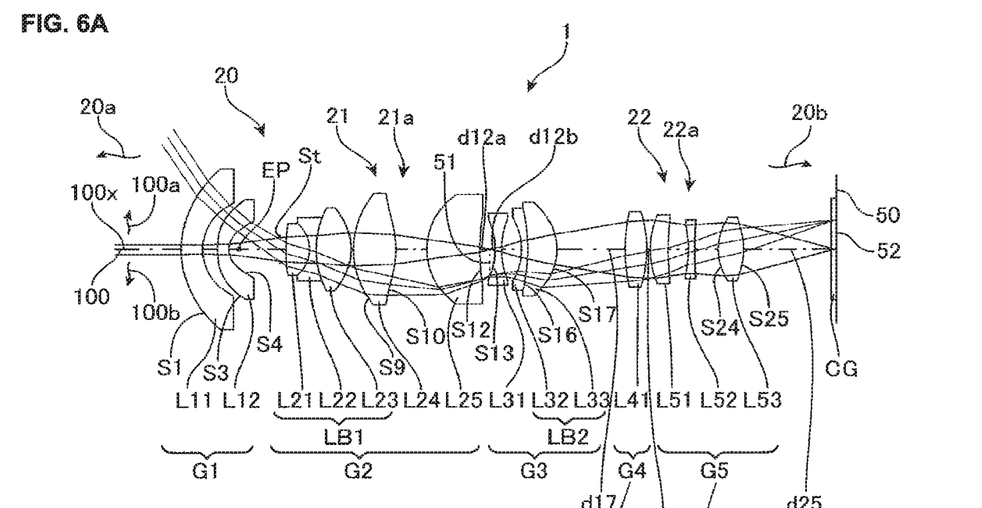
FIGS. 6A and 6B show an arrangement of a zoom lens system according to a second embodiment of the present invention and an imaging apparatus that uses such zoom lens system, with FIG. 6A including the lens arrangement at the wide-angle end and FIG. 6B including the lens arrangement at the telephoto end.
Figure 6B:
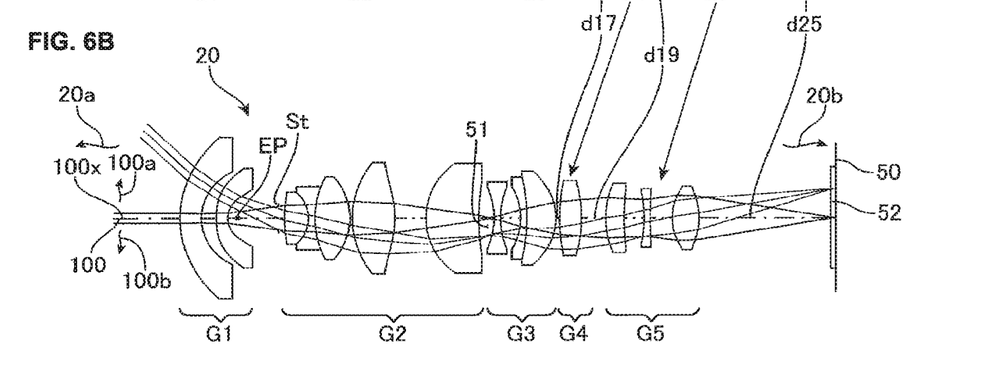

FIGS. 6A and 6B show the overall configuration of a zoom lens system 20 according to a second embodiment of the present embodiment and an imaging apparatus 1 that uses such zoom lens system 20, with FIG. 6(*a*) showing the lens arrangement at the wide-angle end (WIDE) and FIG. 6(*b*) showing the lens arrangement at the telephoto end (TELE).

The second optical system 20 is also composed of a primary image forming lens group 21 that forms the light from the object side 20*a* into the intermediate image 51 and a relay lens group 22 that forms the light from the intermediate image 51 into the final image 52 disposed in that order from the object side 20*a*. The primary image forming lens group 21 according to the present embodiment is also a fixed wide-angle lens group 21*a* that does not move when the zoom lens system 10 carries out zooming. The fixed wide-angle lens group 21*a* is also composed, in order from the object side 20*a*, of a first fixed lens group G1 with negative refractive power that does not move during zooming, a stop St, and a second fixed lens group G2 with positive refractive power that does not move during zooming.

The relay lens group 22 in the present embodiment is also composed, in order from the object side 20*a*, of a third fixed lens group G3 with negative refractive power that does not move during zooming and a variator lens group 22*a* that moves during zooming. The variator lens group 22*a* is composed of a first moving lens group G4 with positive refractive power that moves during zooming and a second moving lens group G5 with positive refractive power that moves during zooming.

As a whole, this zoom lens system 20 is composed of a total of fourteen lenses L11, L12, L21 to L25, L31 to L33, L41, and L51 to L53 that are made of glass.

The third fixed lens group G3 is composed of a biconcave negative lens L31 and a second cemented lens (balsam lens) LB2 where two lenses are stuck together disposed in that order from the object side 20*a*. The second cemented lens LB2 is composed of a second negative meniscus lens L32 whose convex surface S16 is oriented toward the final image side 20*b* and a first positive meniscus lens L33 whose convex surface S17 is oriented toward the final image side 20*b* disposed in that order from the object side 20*a*. Note that since the compositions of the other lens groups G1, G2, G4, and G5 and the forms of the lenses included in such lens groups G1, G2, G4, and G5 are the same as in the first embodiment, the same reference numerals have been assigned and description of the individual lenses is omitted.

In this zoom lens system 20, the second cemented lens LB2 is disposed closer to the final image side 20*b* than the intermediate image 51 and the second optical system 20 is designed so that the Abbe number v32 of the second negative meniscus lens L32 and the Abbe number v33 of the first positive meniscus lens L33 satisfy Conditions (A) and (B) below.

$$45.0 \leq v32 \leq 55.0 \quad \text{(A)}$$

$$15.0 \leq v33 \leq 25.0 \quad \text{(B)}$$

In this zoom lens system 20, Condition (A) is set so that the second negative meniscus lens L32 is provided with weak dispersive power (low dispersion) and Condition (B) is set so that the first positive meniscus lens L33 is provided with strong dispersive power (high dispersion). By combining the second negative meniscus lens L32 that has low dispersion and the first positive meniscus lens L33 that has high dispersion, it is possible to favorably correct chromatic aberration from the visible region to the near-infrared region. Accordingly, even in cases where the incident light is in a wavelength band that includes near-infrared and the correction of chromatic aberration by the first cemented lens LB1 disposed closer to the object side 20*a* than the intermediate image 51 is insufficient, it is possible to reinforce the chromatic aberration correction capability using the second cemented lens LB2. If the ranges of Conditions (A) and (B) are exceeded, there is an increase in axial chromatic aberration and aberration correction becomes difficult.

Figure 7:
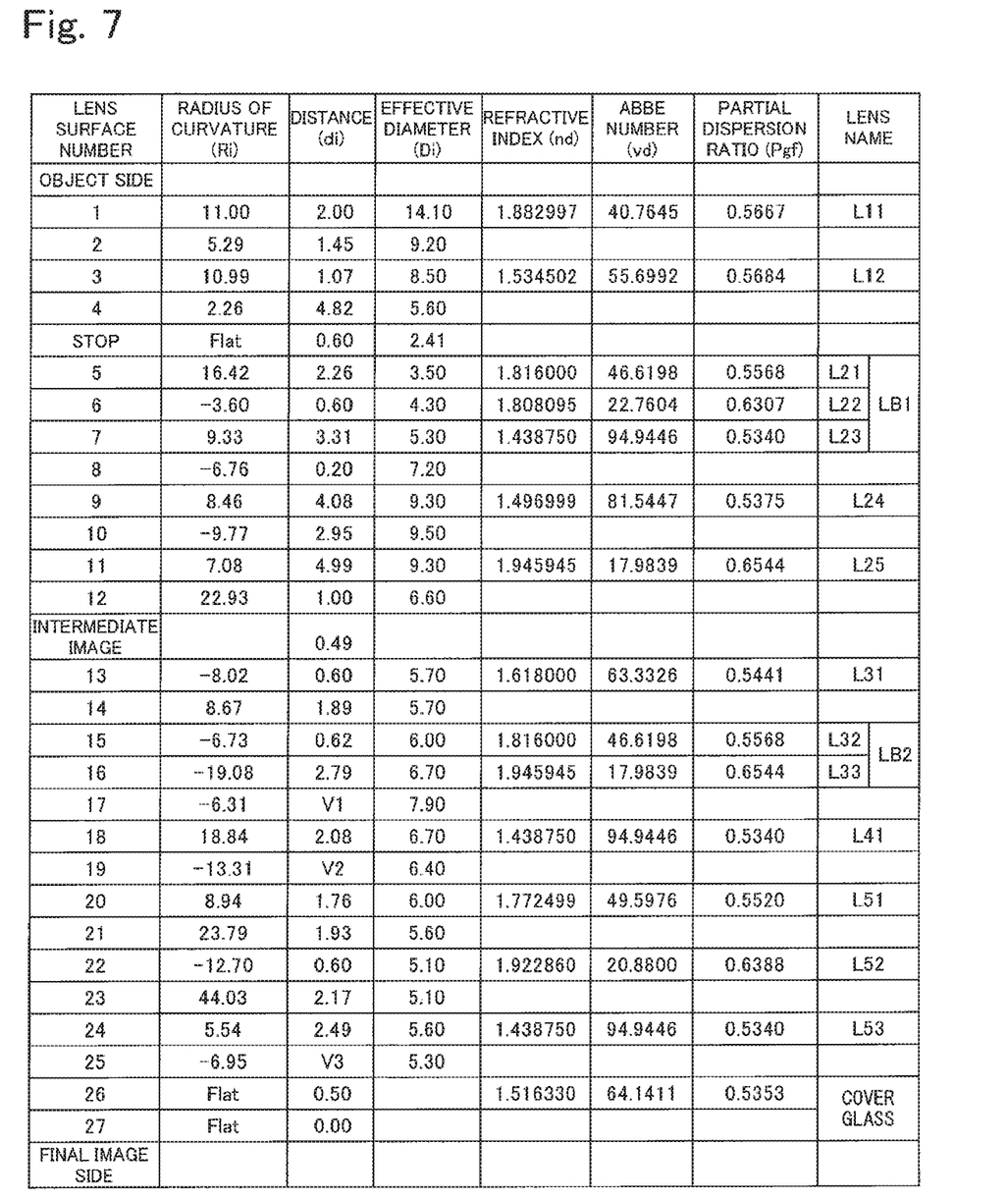
FIG. 7 is a diagram showing lens data of the zoom lens system according to the second embodiment.
Figure 8A:
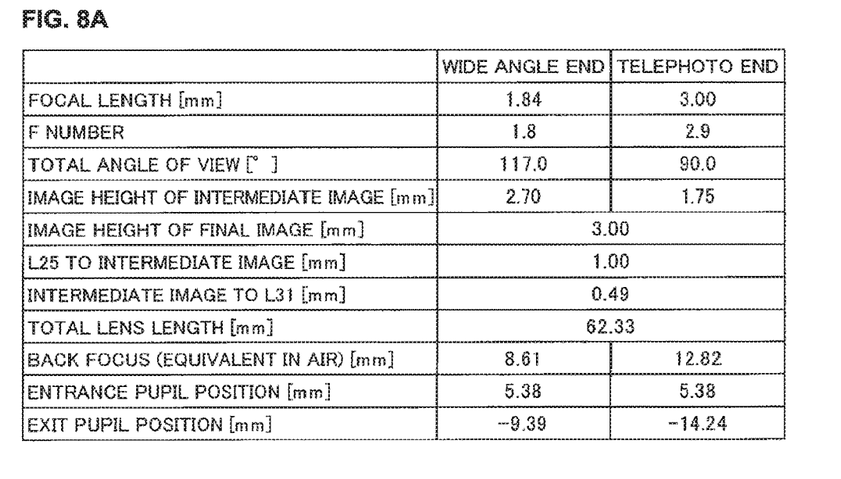
FIGS. 8A-8C are a series of tables showing various numeric values of the zoom lens system according to the second embodiment, with FIG. 8A showing fundamental data, FIG. 8B showing zoom data, and FIG. 8C showing aspherical surface data.
Figure 8B:
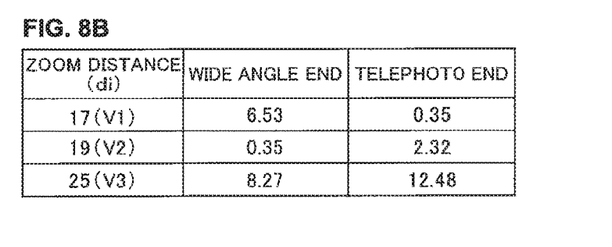
Figure 8C:
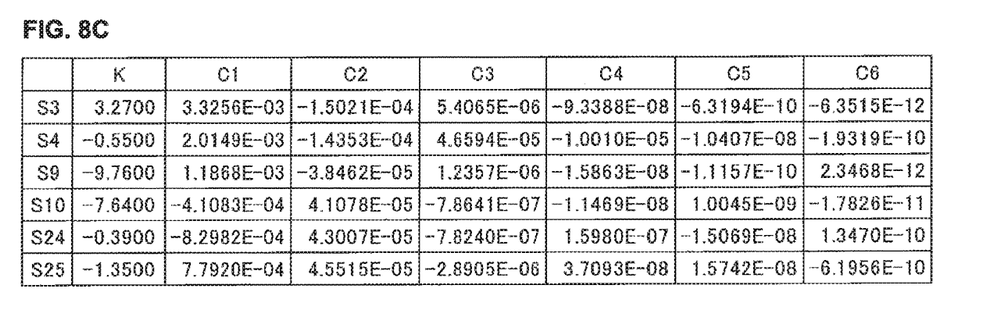

FIG. 7 shows lens data of the various lenses of the zoom lens system 20. FIGS. 8A-8C are various numeric values of the zoom lens system 20. As shown in FIG. 8B, the air gap d17 between the third fixed lens group G3 and the first moving lens group G4, the air gap d19 between the first moving lens group G4 and the second moving lens group G5, and the air gap d25 between the second moving lens group G5 and the cover glass CG all change in the zoom lens system 20. Also, both surfaces S3 and S4 of the negative meniscus lens L12, both surfaces S9 and S10 of the positive lens L24, and both surfaces S24 and S25 of the positive lens L53 are aspherical surfaces.

The values in the equations given as Conditions (1.1) to (1.3), (2.1) to (2.4), (A), and (B) described above of the zoom lens system 20 according to the present embodiment are as shown below. Note that in the present embodiment, the refractive index n3 indicates the refractive index of the first positive meniscus lens L33.

| | |
|---|---|
| $n1=1.88$ | Condition (1.1) |
| $n3=1.95$ | Condition (1.2) |
| $n1/n3=0.96$ | Condition (1.3) |
| $Pgf41=0.53$ | Condition (2.1) |
| $Pgf53=0.53$ | Condition (2.2) |
| $Pgf51=0.55$ | Condition (2.3) |
| $Pgf52=0.64$ | Condition (2.4) |
| $v32=46.6$ | Condition (A) |
| $v33=18.0$ | Condition (B) |

Accordingly, the projection lens system 20 in the present embodiment satisfies Conditions (1.1) to (1.3), (2.1) to (2.4), (A), and (B).

Figure 9A:
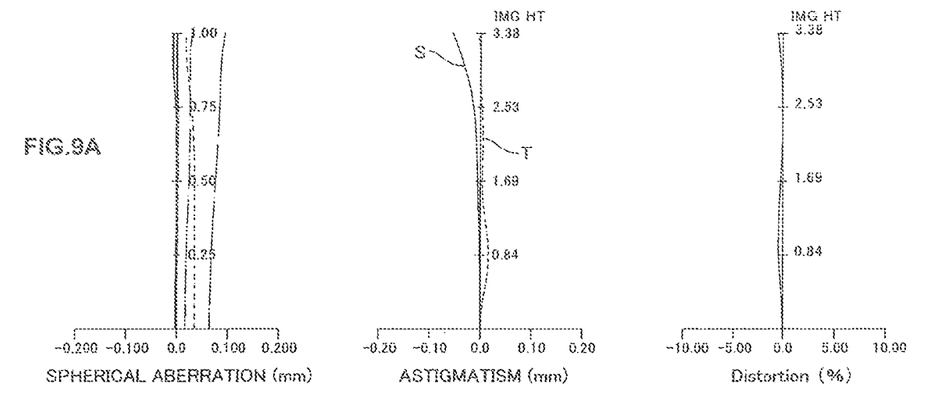
FIGS. 9A and 9B show aberration graphs of the zoom lens system according to the second embodiment, with FIG. 9A showing aberration graphs at the wide angle end and FIG. 9B showing aberration graphs at the telephoto end.
Figure 9B:
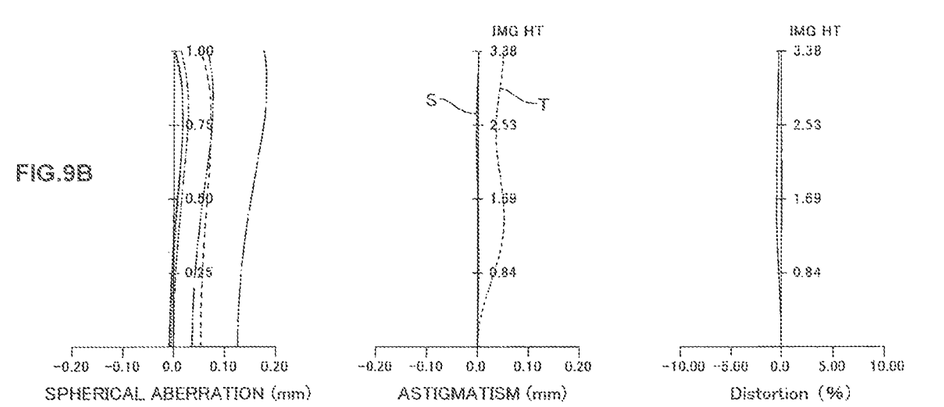
Figure 10:
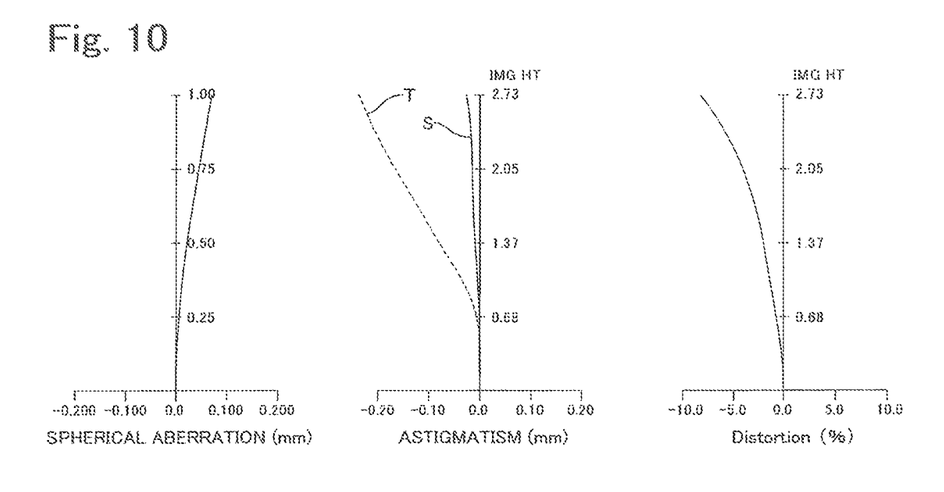
FIG. 10 shows aberration graphs of a first optical system of the zoom lens system according to the second embodiment.

FIGS. 9A and 9B show aberration graphs of the zoom lens system 20 with FIG. 9A showing aberration graphs at the wide-angle end and FIG. 9B showing aberration graphs at the telephoto end. FIG. 10 shows aberration graphs of the primary image forming lens group 21 of the zoom lens system 20. As shown in FIGS. 9A-9B and FIG. 10, all of the aberrations are favorably corrected and it is possible to project sharp images. Note that spherical aberration is shown for the wavelength of 900 nm using a broken line.

Accordingly, the zoom lens system 20 according to the present embodiment is wide angle with a full angle of view of 117° at the wide angle end, has an f number of 1.8 and is capable of forming sharp images from the visible region to the near-infrared region. This means that it is possible to provide the zoom lens system 20 that is favorable for a high-resolution camera (imaging device) that does not have an autofocus mechanism or the like and is used in combined day and night combined monitoring or a variety of applications such as observation, disaster prevention, measurement, and recording.

Note that the present invention is not limited to such embodiments and is defined by the scope of the claims. That is, the primary optical system and/or the secondary optical system of the zoom lens system may include at least one reflective surface (mirror). Also, the invention as defined by each claim may be regarded as being independent to the other claims.

The invention claimed is:

1. A zoom lens system that forms light from an object side into a final image via an intermediate image formed inside the zoom lens system, comprising in order from the object side:
   a plurality of fixed lens groups that includes a positive fixed power lens group disposed at a fixed position on the object side of the intermediate image and closer to the intermediate image than any other lens on the object side, and a negative fixed power lens group disposed at a fixed position on a final image side of the intermediate image and closer to the intermediate image than any other lens on the final image side; and
   a plurality of moving lens groups disposed on the final image side of the intermediate image and further from the intermediate image than any fixed lens group on the final image side of the intermediate image.

2. The zoom lens system according to claim 1,
wherein the positive fixed power lens group includes a positive lens that is disposed closest to the intermediate image and has a highest refractive index among all lenses in the zoom lens system.

3. The zoom lens system according to claim 2,
wherein the negative fixed power lens group includes a negative lens that is disposed closest to the intermediate image.

4. The zoom lens system according to claim 3,
wherein the positive lens is a positive meniscus lens that is convex on the object side and the negative lens is a biconcave negative lens.

5. The zoom lens system according to claim 3,
wherein a distance on an optical axis between the intermediate image and a lens surface that is closest to the intermediate image, of the negative lens is shorter than a distance on the optical axis between the intermediate image and a lens surface that is closest to the intermediate image, of the positive lens.

6. The zoom lens system according to claim 1,
wherein the positive fixed power lens group includes a positive meniscus lens that is convex on the object side and disposed closest to the intermediate image.

7. The zoom lens system according to claim 6,
wherein the negative fixed power lens group includes a negative lens that has concave surface on the object side and is disposed closest to the intermediate image.

8. The zoom lens system according to claim 7,
wherein a distance on an optical axis between the intermediate image and a lens surface that is closest to the intermediate image, of the negative lens is shorter than a distance on the optical axis between the intermediate image and a lens surface that is closest to the intermediate image, of the positive lens.

9. The zoom lens system according to claim 1,
wherein the plurality of fixed lens groups further includes a first fixed power lens group with negative refractive power disposed on the object side of the intermediate image, the first fixed power lens group disposed further from the intermediate image than the positive fixed lens group.

10. The zoom lens system according to claim 1,
wherein the plurality of moving lens groups includes a first moving lens group with positive refractive power and a second moving lens group with positive refractive power.

11. The zoom lens system according to claim 10,
wherein the first moving lens group moves from the final image side toward the object side when zooming from the wide-angle end toward the telephoto end; and
the second moving lens group moves from the final image side toward the object side when zooming from the wide-angle end toward the telephoto end.

12. An imaging apparatus comprising:
the zoom lens system according to claim 1; and
an imaging device disposed at a position where the final image of the zoom lens system is formed.

13. A zoom lens system that forms light from an object side into a final image at a final image side via an intermediate image formed inside the zoom lens system, comprising:
   a plurality of lenses arranged between the object side and the final image side, the plurality of lenses consisting of a plurality of object side lenses and a plurality of final image side lenses;
   wherein the plurality of object side lenses consist of:
      a plurality of fixed power lens groups with fixed lens surfaces disposed at fixed positions between the object side and the intermediate image, the plurality of fixed power lens groups including a positive fixed power lens group with fixed lens surfaces, the positive fixed power lens group disposed at a fixed position on the object side of the intermediate image and closer to the intermediate image than any other lens on the object side;

wherein the plurality of final image side lenses include:
a negative fixed power lens group with fixed lens surfaces, the negative fixed power lens group disposed at a fixed position on the final image side of the intermediate image and closer to the intermediate image than any other lens on the final image side; and a plurality of moving lens groups disposed on the final image side of the intermediate image and further from the intermediate image than any fixed lens group on the final image side of the intermediate image.

14. An imaging apparatus comprising:
the zoom lens system according to claim 13; and
an imaging device disposed at a position where the final image of the zoom lens system is formed.

\* \* \* \* \*